(12) United States Patent
Vanags

(10) Patent No.: US 11,947,932 B2
(45) Date of Patent: Apr. 2, 2024

(54) EXTENSION PROPERTY CALLS

(71) Applicant: Mikus Vanags, Riga (LV)

(72) Inventor: Mikus Vanags, Riga (LV)

(73) Assignee: Logics Research Centre, Riga (LV)

( * ) Notice: Subject to any disclaimer, the term of this patent is extended or adjusted under 35 U.S.C. 154(b) by 0 days.

(21) Appl. No.: 17/529,551

(22) Filed: Nov. 18, 2021

(65) Prior Publication Data
US 2023/0153075 A1    May 18, 2023

(51) Int. Cl.
*G06F 8/20* (2018.01)
*G06F 16/28* (2019.01)

(52) U.S. Cl.
CPC .............. *G06F 8/24* (2013.01); *G06F 16/284* (2019.01)

(58) Field of Classification Search
CPC ............. G06F 8/24; G06F 8/22; G06F 16/284
See application file for complete search history.

(56) References Cited

U.S. PATENT DOCUMENTS

| | | | | |
|---|---|---|---|---|
| 5,889,999 A * | 3/1999 | Breternitz, Jr. | .......... | G06F 8/445 712/201 |
| 7,685,567 B2 | 3/2010 | Meijer | | |
| 8,296,730 B2 * | 10/2012 | Whitechapel | .......... | G06F 9/449 717/148 |
| 9,361,071 B2 | 6/2016 | Vanags | | |
| 10,209,970 B2 * | 2/2019 | Goetz | .......... | G06F 8/43 |
| 10,275,226 B2 * | 4/2019 | Cimadamore | .......... | G06F 8/315 |
| 2002/0095664 A1 * | 7/2002 | Chou | .......... | G06F 9/45504 717/148 |
| 2014/0068557 A1 * | 3/2014 | Vanags | .......... | G06F 8/437 717/116 |
| 2020/0167155 A1 * | 5/2020 | Lu | .......... | G06F 8/437 |

OTHER PUBLICATIONS

The Koka Programming Language (Daan Leijen, Feb. 7, 2022) https://koka-lang.github.io/koka/doc/book.html#sec-basics.
Bill Wagner at al., Extension Methods (C# Programming Guide). Microsoft (2021).
Mikus Vanags, Katlang tutorial. Logics Research Centre (2021).

* cited by examiner

*Primary Examiner* — Qing Chen
*Assistant Examiner* — Amir Soltanzadeh

(57) ABSTRACT

In programming environments, an object can be extended by adding a new property (subroutine) to the collection of the object properties. The properties of the object can be accessed using property access syntax. Extension property call is an innovation which allows the use of an object together with property access expression to access the properties (subroutines) that are not contained in the object itself, but which are contained in another object and are visible in the scope where the property access expression is used. The extension properties do not have special extension property definition syntax. Any regular property (subroutine) can be used as the extension property of the object if the property is visible in the scope where the property access expression is used. Extension property calls makes programming language code concise, improving code readability.

6 Claims, 2 Drawing Sheets

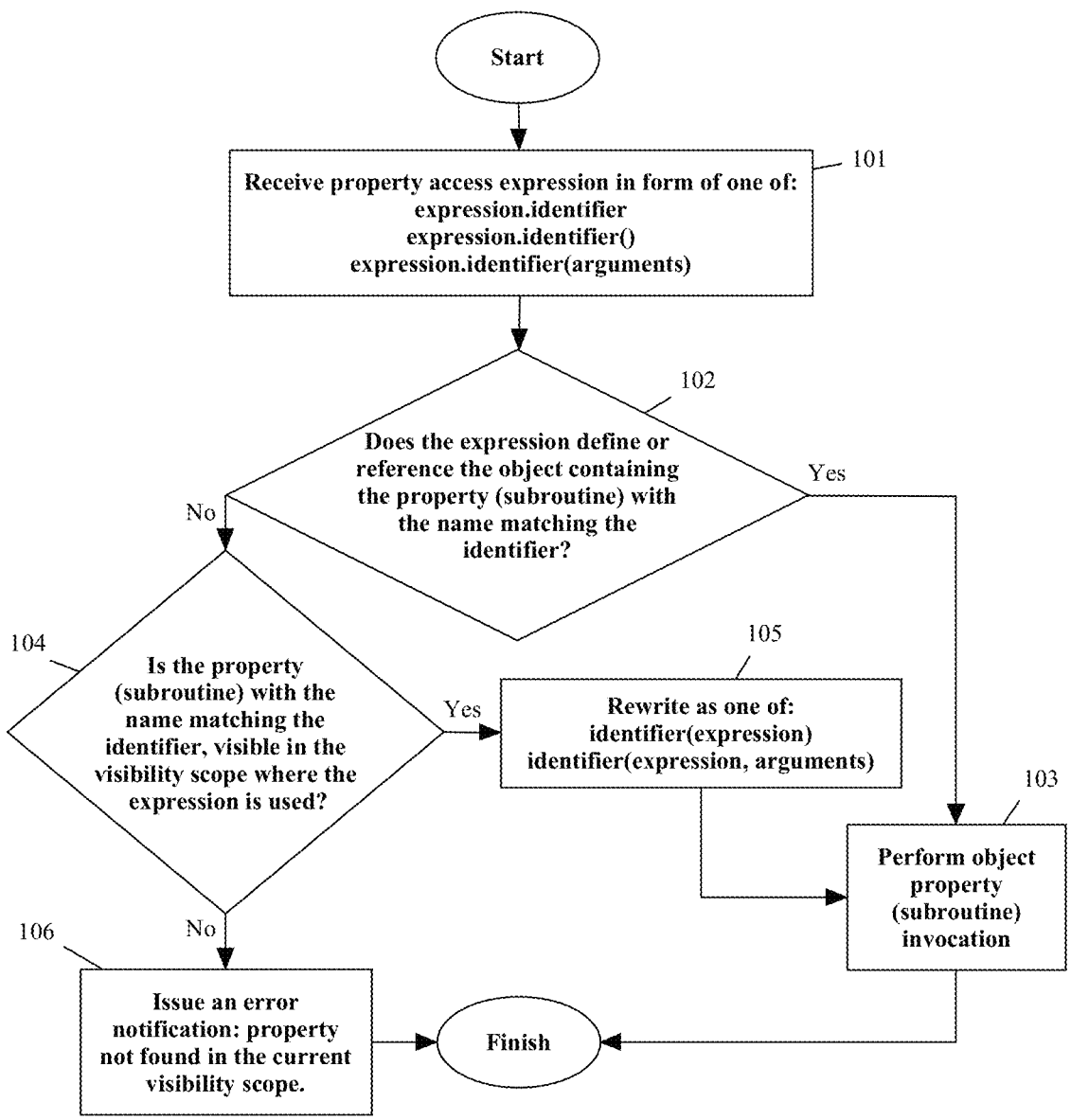

FIG. 2 -Prior Art-

```
public class Person
{
    public Person(string firstName, string lastName)
    {
        FirstName = firstName;
        LastName = lastName;
    }
    public string FirstName { get; }
    public string LastName { get; }
}
//the extension methods are static and declared inside the static type
public static class ExtensionMethodsClass
{
    //keyword 'this' specifies that the extension method
    //extends the capabilities of the type Person
    public static string GetFullName(this Person pers)
    {
        return $"{pers.FirstName} {pers.LastName}";
    }
}
class Program
{
    static void Main()
    {
        var pers = new Person("Kat", "Lang");
        var fullName = pers.GetFullName(); //<-- extension method call
        System.Console.WriteLine(fullName);
    }
}
```

FIG. 3 -Prior Art-

```
public class Person
{
    public Person(string firstName)
    {
        FirstName = firstName;
    }
    public string FirstName { get; }
}
public class PersonHelper
{
    public PersonHelper(Person pers)
    {
        //method GetGreetingText is visible in the current scope
        //but it is not usable as the extension method
        var greeting = pers.GetGreetingText(); //<-- does not compile
    }
    //non-static method
    public string GetGreetingText(Person pers)
    {
        return $"Hello {pers.FirstName}";
    }
}
```

EXTENSION PROPERTY CALLS

BRIEF DESCRIPTION OF DRAWINGS

The methods for providing object extending using extension property calls are further described with a reference to the accompanying drawings in which:

FIG. 1. shows a flowchart diagram demonstrating the logics of the execution of the extension property calls.

FIG. 2.—Prior Art—shows an example of C# programming language code demonstrating extension method declaration and usage.

FIG. 3.—Prior Art—shows an example of C# programming language code demonstrating that a non-static method GetGreetingText cannot be used as extension method in C# 10 (current version of C# language).

FIELD OF THE INVENTION

The invention relates to computer programming language design, more specifically: improvement of non-static subroutine (property, function, method) call execution raising code readability.

DESCRIPTION OF THE PRIOR ART

Programming language KatLang is a new programming language. KatLang has support of list-like data structures called algorithms. An algorithm is a data structure—object instance which is a non-static structure. The algorithm can be viewed as a function because it contains the instructions how to calculate the output. Therefore, the algorithm can be executed (called), but unlike classic mathematical functions, the algorithm can return several values. If the algorithm can contain or return other algorithms, then it is considered a higher order algorithm (function or more generally speaking—subroutine). KatLang program itself is an algorithm which is called a context algorithm.

The algorithm without a name acts like a lambda expression (anonymous function). If the algorithm has a name, then it is called a property. The algorithm can contain zero or more properties.

The following KatLang program is an algorithm containing two properties—'Number' and 'Add1', and the algorithm (KatLang program) forms an output consisting of the property execution 'Add1(Number)':

Number=5//property definition
Add1=a+1//property definition
Add1(Number)//algorithm output The term 'a' in the expression 'Add1=a+1' is an implicit parameter (U.S. Pat. No. 9,361,071 B2). It means, that the property 'Add1' acts as a mathematical function accepting one parameter increasing its value by 1 and returning the increased value.

In programming languages, an object can have properties. If the object does not have a property and a programmer tries to access the property, then the programming language interpreter/compiler issues an error notification.

The following KatLang code demonstrates the attempt to access a non-existent property 'MyProperty' from the property 'Numbers':

Numbers=3, 5//property
Numbers.MyProperty

The property 'Numbers' does not contain the property 'MyProperty' and attempt to access non-existent property results in an invalid KatLang program.

Microsoft® has invented architecture and methods to extend the object with extension methods (U.S. Pat. No. 7,685,567 B2). The extension method is a static method declared in a separate static type (class). A first parameter of the extension method is specifically marked with keyword 'this' and its type determine the type of the objects on which the extension method can be used. C# extension method example is demonstrated in FIG. 2. If the programming language does not support user defined static methods (subroutines), then the "extension methods" invention is not applicable. In FIG. 3. is demonstrated that an instance method in C# cannot be used as extension method.

If an object A has a property X and an object B has a property Y, then these properties can be accessed in KatLang as follows:

A=(X=3)//A is property and X is property of A
B=(Y=6)//B is property and Y is property of B
A.X+B.Y//output is equal to 9

It is not possible to access the property Y directly from the object A, because the property Y is not visible to the object A. The visibility scope of X is A and the visibility scope of Y is B. These are two completely different visibility scopes that do not overlap. Therefore, the following KatLang code is invalid:

A=(X=3)//A is property and X is property of A
B=(Y=6)//B is property and Y is property of B
A.Y//invalid code: A does not have property Y If KatLang would have static user defined structures, then B could be made static and then using Microsoft® invention 'extension methods', the expression 'A.Y' might make sense. KatLang does not support static user defined subroutines (algorithms or properties), therefore, Microsoft® invention "extension methods" is not applicable to KatLang.

It could be useful for KatLang to invent the way to extend existing algorithms with functionality that is available in other algorithms (instances—non-static structures).

SUMMARY OF THE INVENTION

The current invention provides methods for improving programming language parser/interpreter to simplify property (subroutine) usage code. This innovation is called "extension property calls" and it allows the use of an object together with the property access syntax to access the properties (subroutines) which are visible in the scope where the property access expression is used, but which are contained in another object. Extension properties do not have special extension property definition syntax. Any regular property (subroutine) can be used as the extension property of the object if the property is visible in the scope where the object is used.

Extension properties invention makes object property (subroutine) accessing code more concise and allows writing expressions in the same order in which they are processed (executed). This way bracket usage can be reduced in the property (subroutine) usage code and the programming language code will look more readable.

DETAILED DESCRIPTION

The goal is to extend KatLang by modifying processing of property access syntax (expression '.' identifier) to call properties that are visible to the object described by the 'expression' but are not contained in the object itself.

If an object does not have a property, the property access syntax still can be used. If the language does not have the support of user defined static structures, then the visibility scope of the object and the visibility scope of the property should overlap—they both (the object and the property) need to be visible in the context where the property access syntax is used.

In the following KatLang program, the property 'Number' and the property 'Add' share the same visibility scope:
Number=5//property definition
Add1=a+1//property definition The property 'Number' is visible to the property 'Add1' and the property 'Add1' is visible to the property 'Number'. Trying to access the property using property access syntax on the object which does not contain the property, results in an invalid KatLang code:
Number=5//property definition
Add1=a+1//property definition
//'Number' does not contain property 'Add1'
Number.Add1//invalid code:

The expression 'Number.Add1' is called 'extension property call', because the instance of 'Number' does not contain the property named 'Add1' and in the case of 'extension property call' the property 'Add1' is called 'extension property'.

To support extension property calls and make the previously shown KatLang code work, the parser/interpreter of the programming language should be improved as shown in FIG. 1.

At 101 the expression is received in form of one of:
expression.identifier
expression.identifier( )
expression.identifier(arguments)

At 102, it is checked if the object described by 'expression' contains the property described by 'identifier'. If true, then at 103, the actual property of the object is invoked (executed). In this case, it is regular property access expression.

If the object does not contain the property, then at 104, the compiler/interpreter looks for the requested property(subroutine) in the visibility scope where the object and the property access expression is used. If such matching property (subroutine) is found, then it is considered an 'extension property' of the object and at 105, it is created property (subroutine) call expression passing the object itself as the first argument after which follows the arguments that are provided in the extension property call.

If there are no matching regular property found and no matching extension property found, then at 106, the compiler/interpreter issues an error notification.

KatLang program forms an object of data structure called an algorithm, therefore in step 104, the visibility scope search is performed inside the algorithm object.

Ability to translate the extension property access expression 'Number.Add1' to the property execution expression 'Add1(Number)' makes the extension property access expression 'Number.Add1' a valid KatLang expression.

Extension property call containing empty brackets is processed in a similar way. In KatLang, empty brackets do not change the output of the program and the empty brackets are optional, therefore, having the properties 'Number' and 'Add1', the expression 'Number.Add1( )' will be translated to 'Add1(Number)' and then executed.

If the extension property call contains arguments, then the extension property is executed passing the object (from which the extension property is accessed) as the first argument and after it follows the arguments that are provided in the extension property call. The following KatLang example, demonstrates extension property call with arguments:

Number=6
Minus=a−x
Number.Minus(2)

The extension property call 'Number.Minus(2)' is processed as 'Minus(Number,2)'.

The 'expression' part of the 'expression.identifier' shown in FIG. 1. can be in one of the following forms:
1) reference pointing to the property (object instance). In the following KatLang example, the 'expression' part contains a reference 'Number' which points to the property (object instance) named 'Number':
Number=5
Add=a+1
Number.Add//the result is 6
2) an object instance definition. In the following KatLang example, the 'expression' part contains an algorithm '(1, 2)' definition:
Add=a+b
(2, 3).Add//the result is 5
3) a constant. In the following KatLang example, the 'expression' part is a constant expression:
Add=a+1
2.Add//the result is 3
4) a property access expression referencing the object. In the following KatLang example, the 'expression' part contains the expression 'Numbers.First' where 'Numbers' is the property visible to the extension property call and 'Numbers' contains the property named 'First':
Numbers=(First=1 Second=2)
Add=a+1
Numbers.First.Add//the result is 2

Similarly, the 'expression' part can be the extension property call 'Numbers.Add' which is demonstrated in the following KatLang example:
Number=5
Add=a+1
Number.Add.Add//the result is 7

Property access expression can be part of another property access expression and the operator '.' (property (subroutine) access operator) should be processed as left associative operator.

5) a property call expression. In the following KatLang example, the 'expression' part contains the property call expression 'Add(Number)':
Number=5
Add=a+1
Add(Number).Add If the extension property call does not have arguments, then each extension property call is 1 symbol shorter than the regular property call, because the regular property syntax uses brackets '0', but the extension property call syntax uses operator. For example, the expression 'Number. Add' is 1 symbol shorter than the expression: 'Add(Number)'.

Extension property call syntax allows writing the expressions in the same order as they will be executed. This can improve code readability. Classic math syntax requires writing higher order function call expressions in the reversed order in comparison to the order of the expression execution. Many people are familiar with classic math syntax because there are no alternatives. Now, thanks to the extension properties innovation, KatLang can be an alternative.

Thinking abstractly, the extension property calls innovation can be used to write the following abstract code:
A.B.C And the equivalent higher order function calls in classic functional programming style would be the following:
C(B(A))

In both cases, the order of the expression processing will be the following: A, B, C. Writing the expressions in the same order in which they are processed, seems to produce a more readable code.

Using the extension property call syntax, the expression 'Add(2, 3)' can be rewritten to the following expression: '(2, 3).Add'. In this example, the extension property call usage increases the length of KatLang code by 1 symbol. It might be a subjective opinion, but the expression '(2, 3).Add' does not look nicer than the classic alternative—'Add(2, 3)'. Sometimes, the extension property calls innovation can improve the code and sometimes it can make the code longer and less readable.

What is claimed is:

1. A computer-implemented method for invoking a property (subroutine) from a first object instance in a programming environment, wherein the property is contained in a second object instance and not within the first object instance, the method comprising:
   accessing, via a processor, the first object instance and the second object instance, wherein the second object instance includes the property being invoked;
   interpreting, via the processor, a property access expression comprising:
      an expression part representing the first object instance, an identifier part denoting the property within the second object instance, and
      optionally, an argument list comprising one or more arguments for the property invocation;
   executing, via the processor, the property access expression by:
      automatically passing the first object instance as a first argument to the invoked property, and
      sequentially passing any additional arguments from the argument list.

2. The method of claim 1, wherein the expression part includes a reference to the first object instance, enabling the processor to access the first object instance.

3. The method of claim 1, wherein the expression part constitutes the first object instance.

4. The method of claim 1, wherein the expression part comprises a constant value, representing a fixed, immutable state or data within the computer environment.

5. The method of claim 1, wherein the expression part comprises a nested property access expression, facilitating multilayered property invocation within the computer-implemented method.

6. The method of claim 1, wherein the expression part comprises a property call expression.

* * * * *